Aug. 27, 1940.    R. REESE    2,213,093
METER POTENTIAL COIL
Filed March 10, 1938
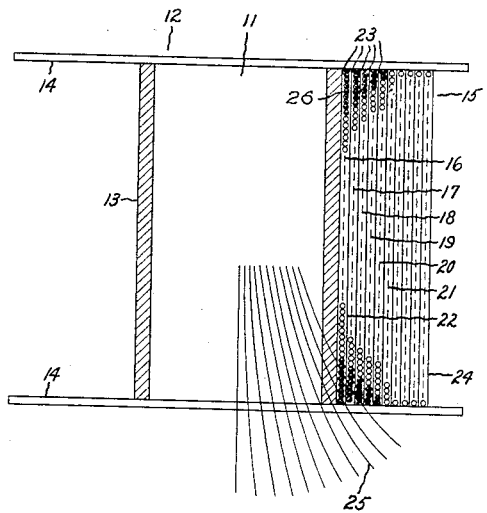
Inventor:
Rudolf Reese,
by Harry E. Dunham
His Attorney.

Patented Aug. 27, 1940

2,213,093

UNITED STATES PATENT OFFICE 2,213,093

METER POTENTIAL COIL

Rudolf Reese, Berlin, Germany, assignor to General Electric Company, a corporation of New York Application March 10, 1938, Serial No. 195,150
In Germany March 25, 1937

1 Claim. (Cl. 175—21)

My invention relates to electro-magnetic coils and concerns particularly a novel coil construction especially well adapted for use as a potential coil of an induction watt-hour meter.

It is an object of my invention to provide an electro-magnetic coil in which there is a relatively large surface leakage path between the initial layers of the winding and the magnetic core upon which the coil is fitted.

It is an object of my invention to wind an electro-magnetic coil in such a manner that the conductor material is utilized to the best possible advantage in obtaining the maximum available linkage between conductor turns and magnetic flux.

Other and further objects and advantages will become apparent as the description proceeds.

In accordance with my invention in its preferred form, when the initial or innermost layer of wire is wound on the winding form the layer is made shorter than the winding form and does not extend to either end thereof. Several succeeding layers are each caused to extend further than the preceding layer until the layers reach the same length as the coil after which succeeding layers are wound to the same length. The invention may be understood more readily from the following detailed description when considered in connection with the accompanying drawing and those features of the invention which are believed to be novel and patentable will be pointed out in the claim appended hereto. The single figure of the drawing is an elevation partially in section of an embodiment of my invention.

In the arrangement illustrated in the drawing there is a core 11 composed of a suitable permeable magnetic material such as soft iron or a magnetic alloy surrounded by a winding form 12 consisting of a tube 13 and flanges or end disks 14. A winding or coil of wire 15 consisting of a plurality of layers is wound around the tube 13 and protected at the ends by the flanges 14. The initial or innermost layer 16 of the coil 15 wound upon the tube 13 fails to extend to either end of the coil or to the end of the tube 13 and succeeding layers of wire 17, 18, 19, 20 and 21 widen out or extend beyond the preceding layer progressively nearer the end of the coil until the full length of the coil has been reached. The remaining layers after the layer 21 may be of the same length.

It will be understood that it is desirable to wind insulating sheets 22 between the successive layers of wire. These sheets 22 may be composed of any suitable material such as tough paper, for example. In order to provide better support for the widening layers of wire 17, 18, 19, 20 and 21, the insulating sheet material 22 between these first few layers of wire may be composed of thicker or stiffer material than usual. If desired, the overhanging portions of the layers of wire 17, 18, 19, 20, and 21 may also be supported by filling in the spaces 23 with insulating material such as thick sheets of paper or a plurality of layers of insulating sheet or tape. Likewise, spaces 23 may also be filled in with turns of dummy wires 26 which are not connected to the rest of the coil 15 and which are left open circuited, preferably broken in several places, to avoid short circuit effects or the generation of objectionable voltages. The outermost layer of the coil 15 may be surrounded by a sheet 24 which is rubberized or of compound impregnated fabric or other suitable protective insulating sheeting. It will be understood that the flanges 14 may either be secured to the tube 13 when the coil is wound on or may be fastened to the remainder of the structure after the wire has been wound and the ends of the insulating sheets 22 have been turned down to bind the ends of the layers in place, according to the convenience of the manufacturer.

In solenoids or electro-magnetic windings, even those having cores composed of highly permeable magnetic material, there is a tendency for the flux path to spread at the ends of the coil or at the ends of the core as shown schematically by flux lines 25 so that if the inner layer of the lining 15 were wound all the way to the end of the coil some of the turns of wire would fail to link the divergent portion of the magnetic flux. By arranging the winding as explained in the foregoing example, this divergent portion of the magnetic flux is kept with the turns of wire so that the inductance of the coil and its electromagnetic efficiency may be increased.

What I claim as new and desire to secure by Letters Patent of the United States, is:

An electromagnetic coil arranged for maximum linkage of magnetic flux with electrical conductor turns comprising a tubular form, a plurality of layers of wire, hollow cylinders of insulating sheet material interposed between successive layers, said wire including open circuited filler turns wound around said tubular form and around the inner group of hollow cylinders at the ends thereof, the axial width of the filler turns at each layer decreasing progressively from the tubular form toward the outside of the coil, said wire including also conductor wire wound in the portions of the layers between said filler turns electrically continuously from one layer to the next to form an electrical winding, the ends of the layers of which are flared in accordance with the divergence of the lines of magnetic flux caused to pass through the coil by electrical current flowing therein, whereby the cutting of the ends of the layers of the electrical winding by such divergent flux is avoided.

RUDOLF REESE.